US012353146B2

(12) United States Patent
Suzuki et al.

(10) Patent No.: US 12,353,146 B2
(45) Date of Patent: *Jul. 8, 2025

(54) PRINTING DEVICE AND CONTROL METHOD OF THE SAME

(71) Applicant: BROTHER KOGYO KABUSHIKI KAISHA, Nagoya (JP)

(72) Inventors: Takashi Suzuki, Nagoya (JP); Tadao Kyotani, Nagoya (JP)

(73) Assignee: BROTHER KOGYO KABUSHIKI KAISHA

( * ) Notice: Subject to any disclaimer, the term of this patent is extended or adjusted under 35 U.S.C. 154(b) by 0 days.

This patent is subject to a terminal disclaimer.

(21) Appl. No.: 18/338,050

(22) Filed: Jun. 20, 2023

(65) Prior Publication Data

US 2023/0333499 A1 Oct. 19, 2023

Related U.S. Application Data

(63) Continuation of application No. 17/821,517, filed on Aug. 23, 2022, now Pat. No. 11,720,038, which is a (Continued)

(30) Foreign Application Priority Data

May 31, 2017 (JP) ................................ 2017-107410

(51) Int. Cl.
*G03G 15/08* (2006.01)

(52) U.S. Cl.
CPC . *G03G 15/0863* (2013.01); *G03G 2215/0697* (2013.01)

(58) Field of Classification Search
CPC .................................................. G03G 15/0863
See application file for complete search history.

(56) References Cited

U.S. PATENT DOCUMENTS 6,556,792 B2 4/2003 Yoshimura
10,564,569 B2 2/2020 Suzuki et al.
(Continued)

FOREIGN PATENT DOCUMENTS

JP H06-067483 A 3/1994
JP H10-026917 A 1/1998
(Continued)

OTHER PUBLICATIONS

Office Action (Decision of Refusal) issued in corresponding Japanese Patent Application No. 2017-107410, Aug. 17, 2021.

*Primary Examiner* — Walter L Lindsay, Jr.
*Assistant Examiner* — Andrew V Do
(74) *Attorney, Agent, or Firm* — Merchant & Gould P.C.

(57) ABSTRACT

A printing device, including: a cartridge storing developer; a memory provided in the cartridge; and a controller configured to execute a printing process of operating the cartridge form a developer image on a sheet by use of the developer in the cartridge, a first access process of performing access to the memory when the printing process is not being executed, and a second access process of performing access to the memory in a period in which the printing process is being executed, in response to a predetermined operation of the printing device, wherein, when an access failure occurs in the first access process, the controller notifies an error, and wherein, when an access failure occurs in the second access process, the controller continues the printing process and executes the second access process again in response to a next timing of the predetermined operation of the printing device.

15 Claims, 7 Drawing Sheets

Related U.S. Application Data continuation of application No. 17/226,295, filed on Apr. 9, 2021, now Pat. No. 11,448,984, which is a continuation of application No. 16/775,640, filed on Jan. 29, 2020, now Pat. No. 11,016,412, which is a continuation of application No. 15/993,839, filed on May 31, 2018, now Pat. No. 10,564,569.

(56) References Cited

U.S. PATENT DOCUMENTS

| | | | |
|---|---|---|---|
| 11,016,412 | B2 | 5/2021 | Suzuki et al. |
| 2001/0016123 | A1 | 8/2001 | Yoshimura |
| 2002/0159779 | A1 | 10/2002 | Morioka et al. |
| 2006/0291876 | A1 | 12/2006 | Kawai et al. |
| 2009/0245861 | A1 | 10/2009 | Eom |
| 2009/0297170 | A1 | 12/2009 | Yokochi |
| 2010/0290791 | A1 | 11/2010 | Sonoda et al. |
| 2014/0105619 | A1 | 4/2014 | Elliott et al. |

FOREIGN PATENT DOCUMENTS

| | | | |
|---|---|---|---|
| JP | H10-031395 | A | 2/1998 |
| JP | 2001-194963 | A | 7/2001 |
| JP | 2002-014579 | A | 1/2002 |
| JP | 2002-296880 | A | 10/2002 |
| JP | 2003-156978 | A | 5/2003 |
| JP | 2003-295703 | A | 10/2003 |
| JP | 2005-151154 | A | 6/2005 |
| JP | 2008-083473 | A | 4/2008 |

PRINTING DEVICE AND CONTROL METHOD OF THE SAME

CROSS REFERENCE TO RELATED APPLICATION

The present application is a continuation of U.S. patent application Ser. No. 17/821,517, filed Aug. 23, 2022, now U.S. Pat. No. 11,448,984, which is a continuation of U.S. patent application Ser. No. 17/226,295, filed Apr. 9, 2021, now U.S. Pat. No. 11,448,984, which is a continuation of U.S. patent application Ser. No. 16/775,640 filed on Jan. 29, 2020, now U.S. Pat. No. 11,016,412, which is a continuation of U.S. patent application Ser. No. 15/993,839 filed on May 31, 2018, now U.S. Pat. No. 10,564,569, and which claims priority from Japanese Patent Application No. 2017-107410, which was filed on May 31, 2017, the disclosures of which are herein incorporated by reference in their entirety.

BACKGROUND

Technical Field

The following disclosure relates to a printing device on which a cartridge including a memory is removably mountable and also relates to a control method of the printing device.

Description of Related Art

There is known a printer on which a toner cartridge storing toner and including a memory is mountable and in which communication between the memory of the toner cartridge and a main body of the printer (access from the main body of the printer to the memory of the toner cartridge) is performed when printing is performed. In the case where an abnormality occurs in the communication with the memory in the known printer, printing is ended after image formation has been performed a predetermined number of times.

SUMMARY

In the known printer described above, however, in the case where the communication abnormality occurs, printing cannot be performed after image formation has been performed a predetermined number of times. Meanwhile, when the communication with the memory is performed in a period in which printing is being performed, the communication abnormality may occur due to influences of vibration and electric noise. Thus, even when no failure occurs in the memory, there may be a risk that printing is suspended or stopped.

Accordingly, one aspect of the present disclosure relates to a technique of decreasing the frequency of suspension or stoppage of printing in a printing device configured to perform access to (communication with) a memory provided in a cartridge.

One aspect of the present disclosure relates to a printing device, including: a cartridge storing developer; a memory provided in the cartridge; and a controller configured to execute a printing process of operating the cartridge to form a developer image on a sheet by use of the developer in the cartridge, a first access process of performing access to the memory when the printing process is not being executed, and a second access process of performing access to the memory in a period in which the printing process is being executed, in response to a predetermined operation of the printing device, wherein, when an access failure occurs in the first access process, the controller notifies an error, and wherein, when an access failure occurs in the second access process, the controller continues the printing process and executes the second access process again in response to a next timing of the predetermined operation of the printing device.

Another aspect of the present disclosure relates to a printing device, including: a cartridge storing developer; a memory provided in the cartridge; and a controller configured to execute a printing process of operating the cartridge to form a developer image on a sheet by use of the developer in the cartridge, a reading process of performing read access to the memory to read information when the printing process is not being executed, and a writing process of performing write access to the memory to write information in a period in which the printing process is being executed, in response to a predetermined operation of the printing device, wherein, when the read access in the reading process fails, the controller notifies an error, and wherein, when the write access in the writing process fails, the controller continues the printing process and executes the writing process again in response to a next timing of the predetermined operation of the printing device.

Still another aspect of the present disclosure relates to a control method of a printing device including a cartridge storing developer, a memory provided in the cartridge, and a controller, the control method including: a step of executing a printing process in which the cartridge is operated to form a developer image on a sheet by use of the developer in the cartridge; a step of executing a first access process in which access from the controller to the memory is performed when the printing process is not being executed, and a step of executing a second access process in which access from the controller to the memory is performed in a period in which the printing process is being executed, in response to a predetermined operation of the printing device, wherein, when an access failure occurs in the first access process, an error is notified, and wherein, when an access failure occurs in the second access process, the printing process is continued, and the second access process is again executed in response to a next timing of the predetermined operation of the printing device.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which.

DETAILED DESCRIPTION OF THE EMBODIMENT

Figure 1:
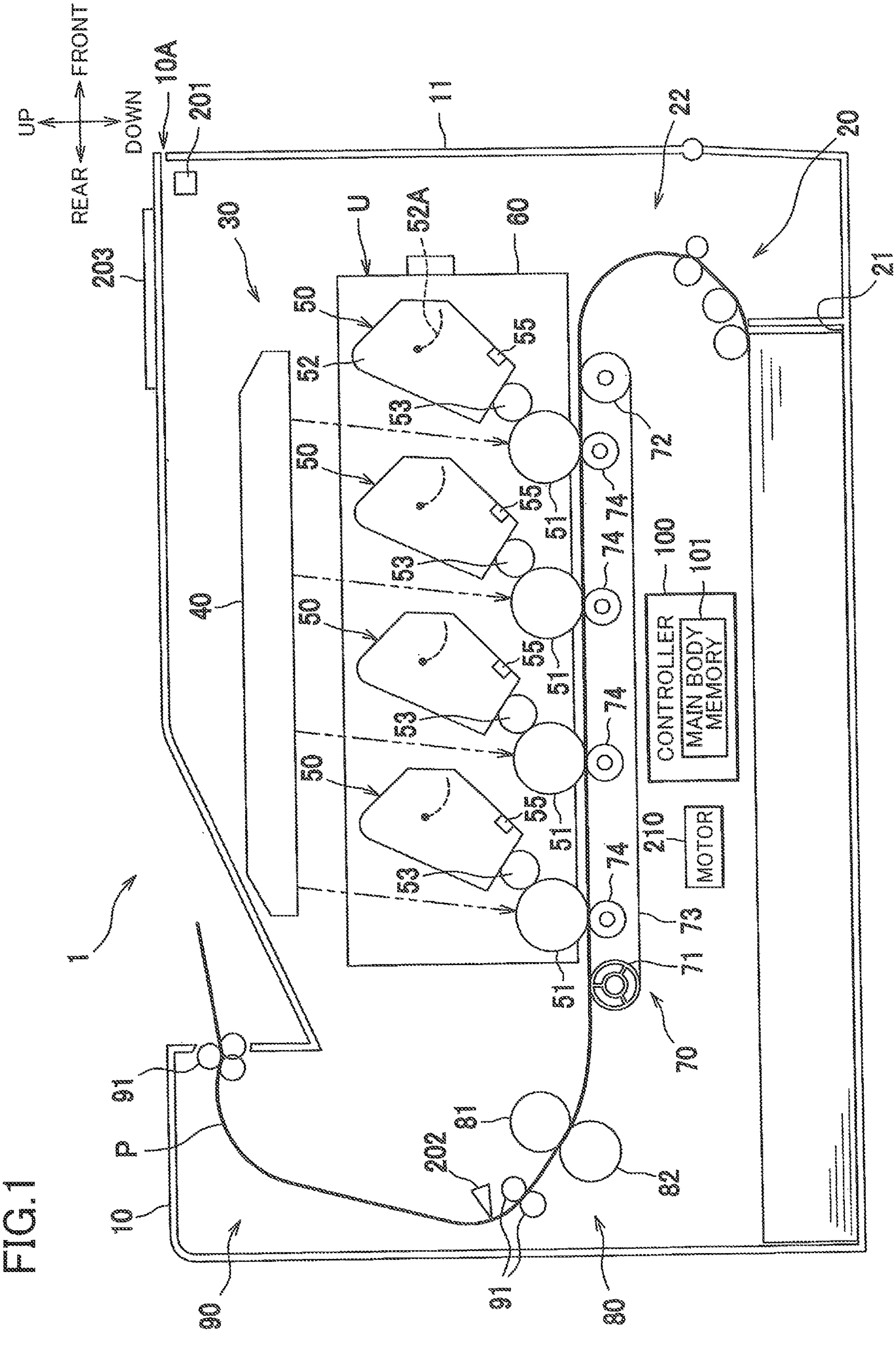
FIG. 1 is a view of a color printer according to one embodiment.

There will be explained in detail one embodiment referring to the drawings. In the following explanation, there will be first explained an overall structure of a color printer 1 as one example of a printing device and thereafter explained features of the present disclosure.

In the following explanation, directions are defined based on directions indicated in FIG. 1. That is, a right side and a left side in FIG. 1 are respectively defined as a front side and a rear side, and a back side and a front side of the sheet of FIG. 1 are respectively defined as a right side and a left side. Further, an up-down direction in FIG. 1 is defined as an up-down direction.

As shown in FIG. 1, the color printer 1 includes, in a housing 10, a sheet supplier 20 configured to supply a sheet P, an image forming portion 30 configured to form an image on the sheet P supplied from the sheet supplier 20, a sheet discharger 90 configured to discharge the sheet P on which the image is formed, and a controller 100.

The housing 10 has an opening 10A formed in its front surface. The housing 10 includes a front cover 11 as one example of a cover. The front cover 11 pivots about its lower end portion so as to open and close the opening 10A. An opening/closing sensor 201 for detecting opening and closing of the front cover 11 is disposed near the opening 10A. When the front cover 11 is closed, the opening/closing sensor 201 outputs, to the controller 100, a signal indicative of closing of the front cover 11.

The sheet supplier 20 includes: a sheet-supply tray 21 for storing the sheets P and a sheet conveyor mechanism 22 configured to convey the sheet P from the sheet-supply tray 21 to the image forming portion 30.

The image forming portion 30 includes a scanner unit 40, a process unit U, a transfer unit 70, and a fixing device 80.

The scanner unit 40 is provided in an upper portion of the housing 10 and includes a laser light emitter, a polygon mirror, lenses, and reflecting mirrors (all not shown). In the scanner unit 40, a laser beam is applied to a surface of each photoconductive drum 51 by high-speed scanning along a path indicated by the long dashed double-short dashed line in FIG. 1.

The process unit U is disposed in the housing 10 and includes four process cartridges 50, each as one example of a cartridge, and a holder 60.

Each process cartridge 50 contains toner as one example of developer. The four process cartridges 50 are arranged in the front-rear direction in the holder 60. Each process cartridge 50 includes a developing roller 53, a toner storage chamber 52, and an agitator 52A for agitating the toner in the toner storage chamber 52. The four process cartridges 50 respectively contain different colors of toner, i.e., yellow, magenta, cyan, and black. The photoconductive drum 51, the developing roller 53, and the agitator 52A are rotated by a motor 210.

Each process cartridge 50 includes a memory 55. The memory 55 stores type information indicating a type of the process cartridge 50 and counter information indicating parameters, such as a usage amount of the toner, that change in accordance with an operation of the color printer 1. In the present embodiment, the memory 55 stores, as the type information, model information indicating a model of the process cartridge 50 and color information indicating the color of the toner contained in the process cartridge 50. Further, the memory 55 stores, as the counter information, a sheet counter Cp indicating the number of printed sheets, a total dot counter CD indicating a total amount of the number of dots of image data corresponding to the toner usage amount, and a total rotation number counter CR indicating the total number of rotations of the developing roller 53.

Figure 2:
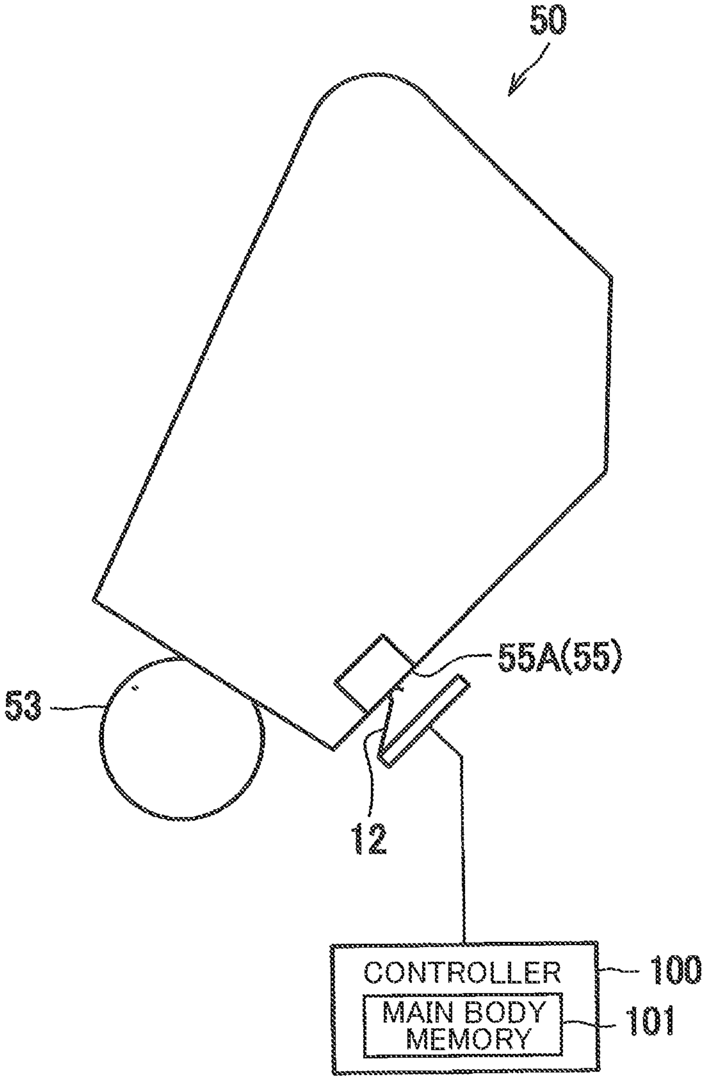
FIG. 2 is a view of a terminal of a memory and an electrode in a housing.

As shown in FIG. 2, the memory 55 is provided on an exterior of the process cartridge 50. The memory 55 is provided with a terminal 55A exposed to the exterior of the process cartridge 50. When the terminal 55A comes into contact with an electrode 12 provided in the housing 10, specifically, in the holder 60, so as to be electrically conductive with the electrode 12, the terminal 55A is connected to the controller 100. When the developing roller 53 and other members are rotated and the process cartridge 50 is accordingly vibrated, the conductive state of the terminal 55A and the electrode 12 may become unstable.

Returning back to FIG. 1, the holder 60 integrally holds the four process cartridges 50. The holder 60 holds the photoconductive drums 51 and chargers (not shown) corresponding to the respective process cartridges 50. The holder 60 is removably mountable on the housing 10 through the opening 10A which is opened by pivoting the front cover 11. That is, the process cartridges 50 are removably mountable on the housing 10 via the holder 60.

The transfer unit 70 is disposed between the sheet supplier 20 and the four process cartridges 50. The transfer unit 70 includes a drive roller 71, a driven roller 72, a conveyor belt 73, and four transfer rollers 74.

The drive roller 71 and the driven roller 72 are disposed in parallel to each other so as to be spaced apart from each other in the front-rear direction. The conveyor belt 73 in the form of an endless belt is looped over the drive roller 71 and the driven roller 72. The four transfer rollers 74 are disposed inside the loop of the conveyor belt 73 such that the conveyor belt 73 is nipped by and between the four transfer rollers 74 and the photoconductive drums 51 and such that the four transfer rollers 74 are opposed to the corresponding photoconductive drum 51. A transfer bias is applied to each transfer roller 74 when a toner image is transferred as described later.

The fixing device 80 is disposed behind the four process cartridges 50 and the transfer unit 70. The fixing device 80 includes a heating roller 81 and a pressure roller 82 disposed opposite to the heating roller 81 for pressing the heating roller 81.

A sheet sensor 202 configured to detect the sheet P discharged from the fixing device 80 is disposed downstream of the fixing device 80 in a conveyance direction of the sheet P. The sheet sensor 202 includes a swing lever configured to swing by being pushed by the sheet P that is being conveyed and an optical sensor configured to detect swinging of the swing lever. In the present embodiment, the sheet sensor 202 is in an ON state while the sheet P is passing, namely, while the swing lever is being laid down by the sheet P.

In the image forming portion 30 constructed as described above, the surface of each photoconductive drum 51 is uniformly charged by the charger and is subsequently exposed by the scanner unit 40. Thus, the potential at the exposed portion of the surface of the photoconductive drum 51 is lowered, so that an electrostatic latent image based on image data is formed on the photoconductive drum 51. Subsequently, the toner in the toner storage chamber 52 is supplied by the developing roller 53 to the electrostatic latent image on the photoconductive drum 51, so that a toner image is borne on the photoconductive drum 51.

Thereafter, the sheet P supplied onto the conveyor belt 73 passes between the photoconductive drums 51 and the transfer rollers 74, so that the toner image formed on each photoconductive drum 51 is transferred to the sheet P. The sheet P then passes between the heating roller 81 and the pressure roller 82, whereby the toner images on the sheet P are thermally fixed.

The sheet discharger 90 includes a plurality of conveying rollers 91 for conveying the sheet P. The sheet P on which the toner images are transferred and thermally fixed is conveyed by the conveying rollers 91 and discharged outside the housing 10.

The controller 100 includes a CPU, a RAM, a ROM, a nonvolatile memory, an ASIC, and an input/output circuit. The controller 100 executes control by executing various sorts of arithmetic processing based on a print instruction output from an external computer, signals output from the sensors 201, 202, and programs and data stored in the ROM, for instance. The controller 100 is configured to execute a printing process, an obtaining process, a first access process, and a second access process. In other words, the controller 100 operates based on the programs so as to function as a means to execute the processes described above. Further, a control method by the controller 100 includes steps of executing the processes. In the following explanation, the storage media such as the RAM and the nonvolatile memory of the controller 100 will be collectively referred to as "main body memory 101" for convenience sake.

The printing process is a process in which the process cartridge 50 is operated to form an image on the sheet P by use of the toner in the process cartridge 50. The controller 100 starts the printing process in response to reception of the print instruction and ends the printing process on the condition that printing based on all print data in the print instruction is completed.

The obtaining process is a process of obtaining a usage amount of the toner. Specifically, the controller 100 executes the obtaining process in response to detection of the sheet P by the sheet sensor 202. In the obtaining process, the controller 100 obtains the number of dots of image data corresponding to the sheet P detected by the sheet sensor 202 as an obtained value of the toner usage amount. When the controller 100 obtains the obtained value of the toner usage amount, the controller 100 increments the total dot counter CD of the main body memory 101.

The first access process (communication process) is an access process (communication process) for obtaining information from the memory 55 of the process cartridge 50. Specifically, in the first access process, the controller 100 obtains the type information and the counter information from the memory 55. The controller 100 executes the first access process when the printing process is not being executed. In the first access process, the controller 100 performs read access to the memory 55 to read the information from the memory 55. In this sense, the first access process may be referred to as a reading process. The read access is electrical communication with the memory 55.

Specifically, the controller 100 executes the first access process in response to turn-on of the color printer 1 or in response to closing of the front cover 11. More specifically, in response to reception of a signal indicative of turn-on of the color printer 1 or in response to reception of a signal indicative of closing of the front cover 11 from the opening/closing sensor 201, the controller 100 executes the first access process before the process cartridge 50 is operated.

Here, "the process cartridge 50 is operated" not only means that components of the process cartridge 50 such as the developing roller 53 and the agitator 52A are rotated, but also means that a voltage for forming the toner image is applied to the components of the process cartridge 50. In the present embodiment, the controller 100 executes the first access process before the voltage is applied to the developing roller 53 and so on.

In the case where an abnormality occurs in the access to the memory 55 in the first access process, the controller 100 retries the access a first predetermined number of times. The determination as to whether the access is abnormal or not is made using a checksum, for instance. It is noted that the first predetermined number of times may be once or may be a plurality of times.

In the case where the abnormality is not removed or corrected even by the first predetermined number of times of retry, the controller 100 determines an access failure. When the controller 100 determines that the access failure has occurred in the first access process, the controller 100 notifies an error. Specifically, the controller 100 displays an error message on a display 203 provided on the housing 10. On the other hand, when the controller 100 determines that the access in the first access process has succeeded, the controller 100 determines, based on the type information obtained from the memory 55, whether the process cartridge 50 set or mounted at a specific position is an appropriate process cartridge 50 that should be used at the specific position.

For instance, based on the color information obtained from the memory 55, the controller 100 determines whether, at a position at which the process cartridge 50 containing black toner should be mounted, the process cartridge 50 containing toner whose color is other than black is erroneously mounted. Further, based on the model information obtained from the memory 55, the controller 100 determines whether the type of the mounted process cartridge 50 is an appropriate type that can be used in the color printer 1.

Further, when the controller 100 determines that the access in the first access process has succeeded, the controller 100 stores, in the main body memory 101, the counter information obtained from the memory 55.

The second access process (communication process) is an access process (communication process) for writing information in the memory 55. Specifically, in the second access process, the controller 100 writes, in the memory 55, the counter information stored in the main body memory 101 and updated during execution of the printing process. The controller 100 executes the second access process in response to a predetermined operation of the color printer 1 in a period in which the printing process is being executed. In other words, the controller 100 executes the second access process in the period in which the printing process is being executed, in response to the predetermined operation of the color printer 1 as a trigger. In the second access process, the controller 100 performs write access to the memory 55 to write the information in the memory 55. In this sense, the second access process may be referred to as a writing process. The write access is electrical communication with the memory 55.

In the present embodiment, the following two operations (each as a trigger) are illustrated as the predetermined operation: detection of the sheet P by the sheet sensor 202; and an increase of the number of rotations of the developing roller 53 by not less than a second threshold TH2 from a time point of a preceding predetermined operation. In the present embodiment, in order to determine that the number of rotations of the developing roller 53 has currently increased by not less than the second threshold TH2 from the time point of the preceding predetermined operation, namely, from the time point when the number of rotations of the developing roller 53 became equal to or greater than the second threshold TH2 last time, a rotation number counter Cr for counting the number of rotations of the developing roller 53 is compared with the second threshold TH2, and the rotation number counter Cr is reset every time the rotation number counter Cr becomes equal to or greater than the second threshold TH2 (Cr≥TH2). That is, the main body memory 101 stores the total rotation number counter CR described above and the rotation number counter Cr for determining timing of starting the second access process.

In the present embodiment, in the case where the predetermined operation is the detection of the sheet P, namely, in the case where the second access process is triggered by the detection of the sheet P, the counter information to be written in the memory 55 in the second access process is the updated sheet counter Cp and the updated total dot counter CD. On the other hand, in the case where the predetermined operation is the increase of the number of rotations of the developing roller 53, namely, in the case where the second access process is triggered by the increase of the number of rotations of the developing roller 53, the counter information to be written in the memory 55 in the second access process is the updated total rotation number counter CR.

In the case where an abnormality occurs in the access to the memory 55 in the second access process, the controller 100 retries the access a second predetermined number of times. Here, the determination as to whether the access is abnormal or not is made using a checksum, for instance. It is noted that the second predetermined number of times is greater than the first predetermined number of times.

In the case where the abnormality is not removed or corrected even by the second predetermined number of times of retry, the controller 100 determines an access failure. When the access failure has occurred in the second access process, the controller 100 continues the printing process and again executes the second access process in response to a next timing of the predetermined operation.

It is noted that, in the present embodiment, the controller 100 executes the second access process depending upon conditions even in a period in which the printing process is not being executed. Specifically, in the case where the second access process has failed during execution of the printing process and the printing process is ended in a state in which the second access process has failed, the controller 100 executes the second access process after the end of the printing process in question. Further, in the case where the rotation number counter Cr of the main body memory 101 becomes equal to or greater than the second threshold TH2, the controller 100 executes the second access process irrespective of whether the printing process is executed or not.

Referring next to FIGS. 3-6, there will be explained an operation of the controller 100. The controls shown in FIGS. 3-6 are executed individually for the respective four process cartridges 50.

Figure 3:
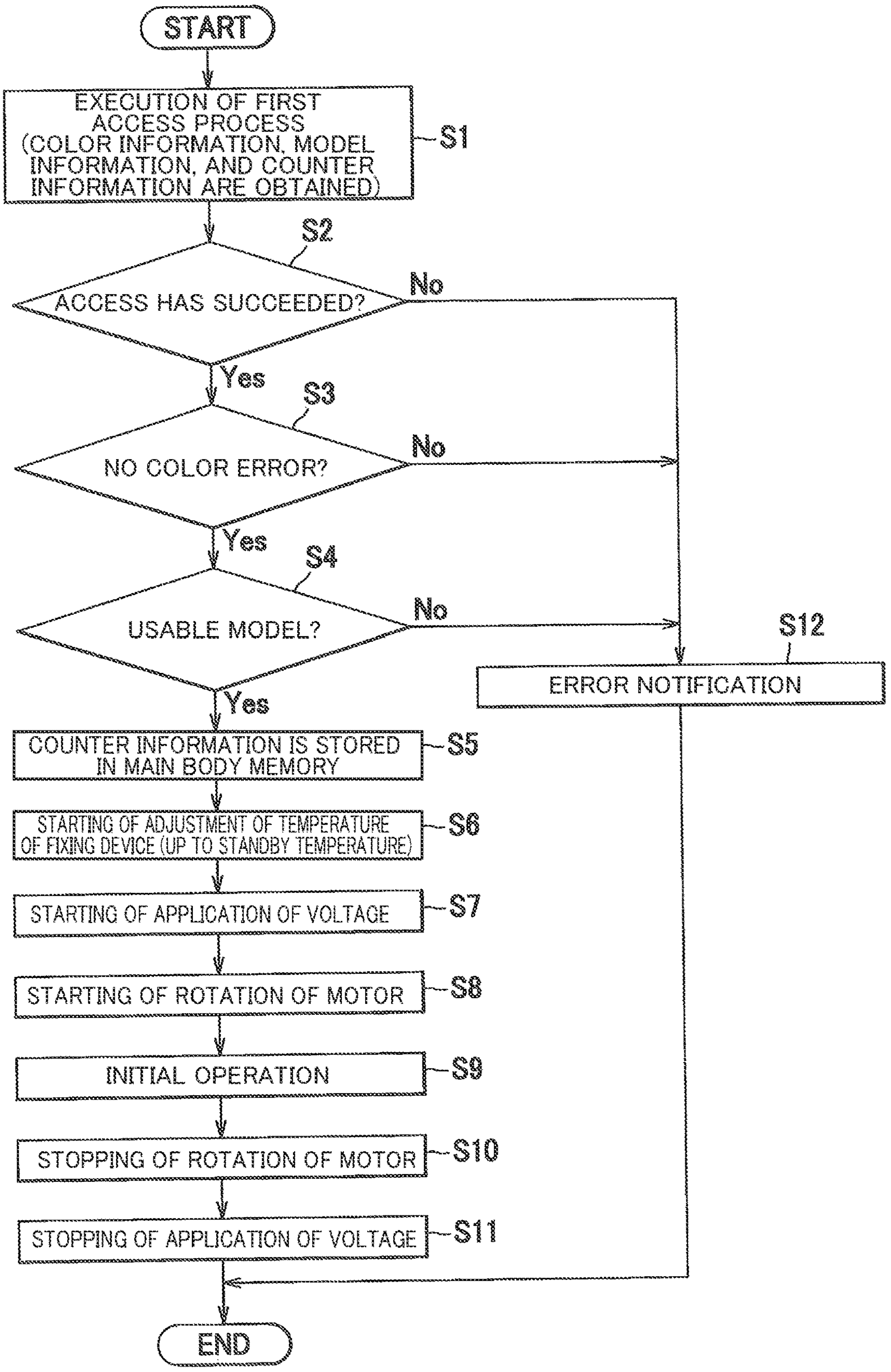
FIG. 3 is a flowchart indicating an operation of a controller performed when the printer is turned on, for instance.

The controller 100 executes an initial control shown in FIG. 3 in response to turn-on of the color printer 1 or in response to closing of the front cover 11. In the initial control, the controller 100 executes the first access process (S1).

After step S1, the controller 100 determines whether the access in the first access process has succeeded (S2). Specifically, at step S2, the controller 100 determines whether an access abnormality has occurred. In the case where the abnormality has occurred, the controller 100 retries the access the first predetermined number of times. In the case where the abnormality is not removed even by the first predetermined number of times of retry, the controller 100 determines that the access failure has occurred (No) and notifies an error (S12).

When the access has been normally performed at step S2, the controller 100 determines that the access has succeeded (Yes), and step S3 is subsequently implemented. When the access in the first access process has succeeded, the controller 100 obtains the color information, the model information, and the counter information in the memory 55. Subsequently, at step S3, the controller 100 checks the process cartridge 50 for color error, based on the color information obtained from the memory 55. In other words, the controller 100 determines at step S3 whether, at a position at which the process cartridge 50 containing the toner of a predetermined color should be mounted, an inappropriate process cartridge 50 containing the toner whose color is other than the predetermined color is erroneously mounted (S3).

When it is determined at step S3 that no color error is found (Yes), the controller 100 determines, based on the model information obtained from the memory 55, whether the mounted process cartridge 50 is a usable model that can be used in the color printer 1 (S4). When it is determined at step S4 that the mounted process cartridge 50 is the usable model (Yes), the controller 100 stores, in the main body memory 101, the counter information obtained from the memory 55 (S5). On the other hand, when a negative determination (No) is made at step S3 or step S4, the controller 100 notifies an error (S12).

After step S5, the controller 100 turns on a heater in the heating roller 81 of the fixing device 80 and starts a temperature adjusting control for raising the temperature of the heating roller 81 to a standby temperature (S6). After step S6, the controller 100 starts application of a voltage to the developing roller 53, etc. (S7).

After step S7, the controller 100 starts rotating the motor 210 for rotating the developing roller 53, etc. (S8). By executing processes at steps S6-S8, the controller 100 executes, for a predetermined length of time, an initial operation such as agitation of the toner in the process cartridge 50 (S9). After step S9, the controller 100 stops rotating the motor 210 (S10) and thereafter stops application of the voltage (S11). Thus, the present control is ended.

Figure 4:
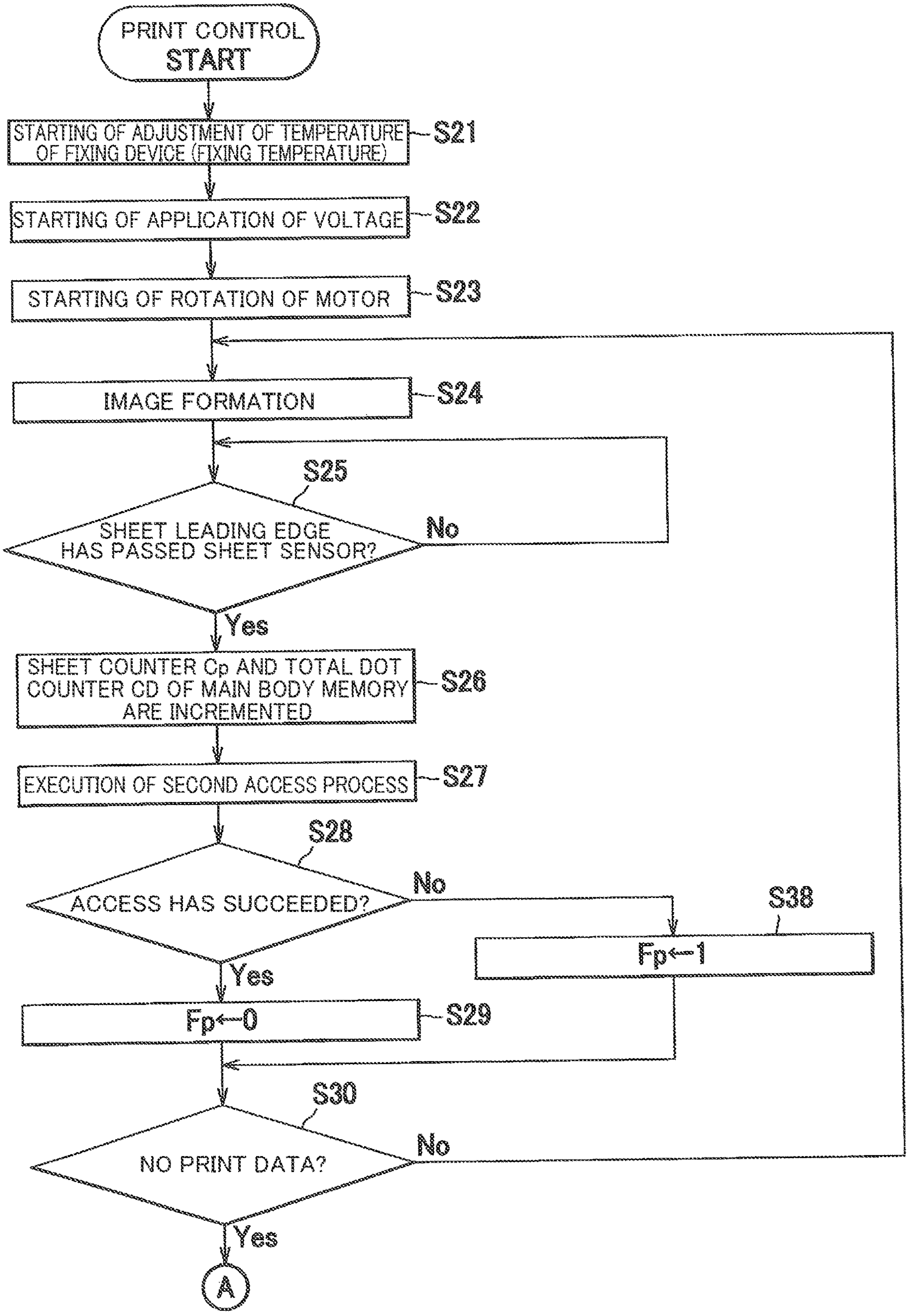
FIG. 4 is a flowchart indicating a first part of a print control.
Figure 5:
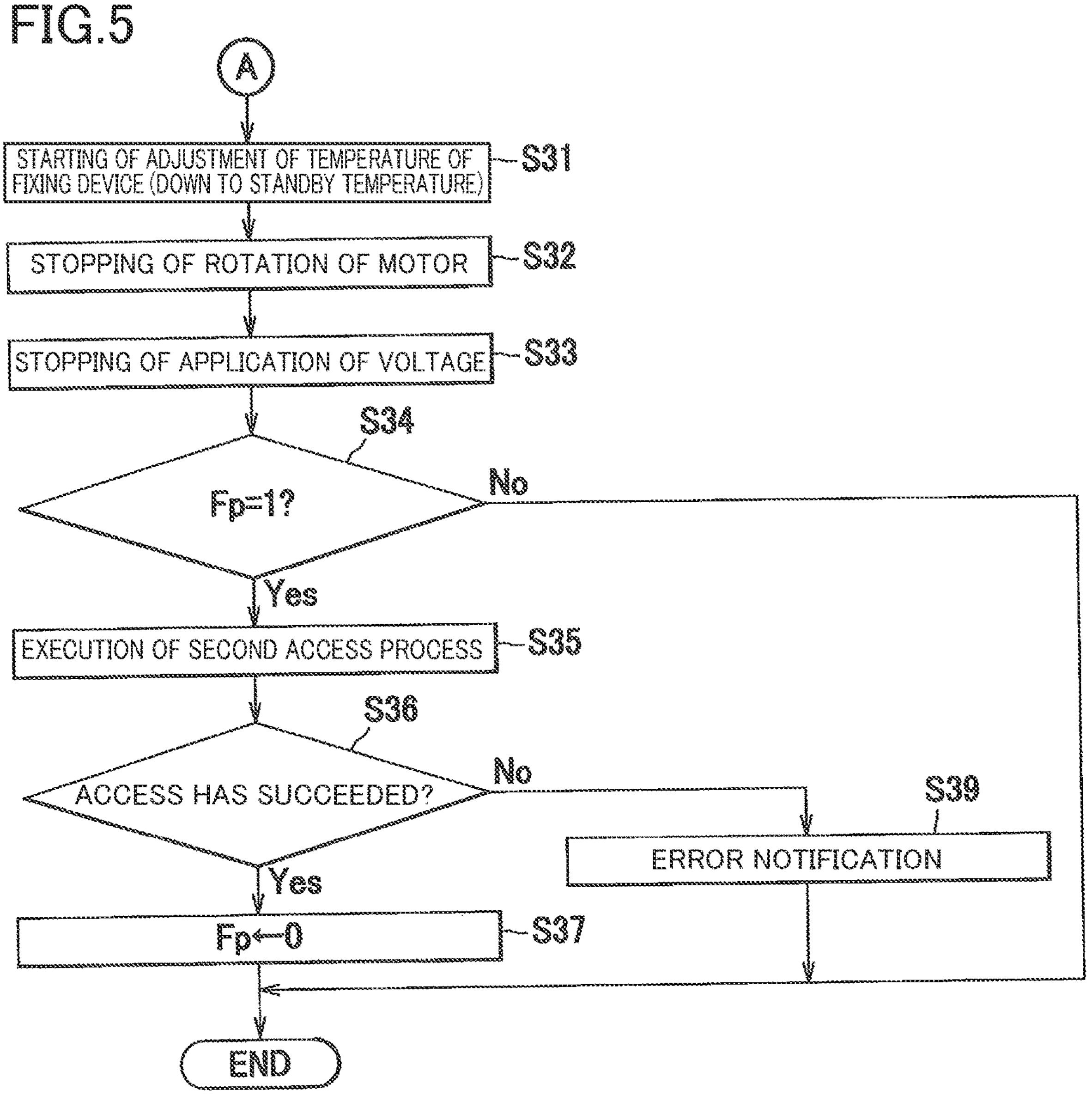
FIG. 5 is a flowchart indicating a latter part of the print control.

The controller 100 executes a print control shown in FIGS. 4 and 5, in response to reception of a print instruction. As shown in FIG. 4, in the print control, the controller 100 initially turns on the heater in the heating roller 81 of the fixing device 80 and starts a temperature adjusting control for raising the temperature of the heating roller 81 to a fixing temperature higher than the standby temperature (S21). After step S21, the controller 100 starts voltage application to the developing roller 53, etc. (S22).

After step S22, the controller 100 starts rotating the motor 210 (S23). After step S23, the controller 100 performs image formation on one sheet P (S24).

After step S24, the controller 100 determines whether a leading edge of the sheet P has passed the sheet sensor 202 (S25). When it is determined at step S25 that the leading edge of the sheet P has passed the sheet sensor 202 (Yes), the controller 100 obtains a usage amount of the toner from the image data and increments the sheet counter Cp and the total dot counter CD in the main body memory 101 (S26).

After step S26, the controller 100 executes the second access process (S27). After step S27, the controller 100 determines whether the access in the second access process has succeeded (S28). Specifically, at step S28, the controller 100 determines whether an access abnormality has occurred. In the case where the abnormality has occurred, the controller 100 retries the access the second predetermined number of times that is greater than the first predetermined number of times. In the case where the abnormality is not removed even by the second predetermined number of times of retry, the controller 100 determines that an access failure has occurred (No) and sets a first flag Fp to 1 (S38), the first flag Fp indicating the access failure.

When the access has been normally performed at step S28, the controller 100 determines that the access has succeeded (Yes), and the control flow goes to step S29 at which the controller 100 sets the first flag Fp to 0. When the access at step S28 has succeeded, the sheet counter Cp and the total dot counter CD in the main body memory 101 are written in the memory 55 as described above.

After step S29 or step S38, the controller 100 determines whether the print data based on which printing is to be performed no more remains (S30). When the controller 100 determines at step S30 that the print data still remains (No), the control flow goes back to step S24. When the controller 100 determines at step S30 that no print data remains (Yes), the controller 100 starts a temperature adjusting control for lowering the temperature of the heating roller 81 to the standby temperature (S31), as shown in FIG. 5.

After step S31, the controller 100 stops rotating the motor 210 (S32) and subsequently stops the voltage application (S33). The processes at steps S21-S33 correspond to the printing process. That is, the printing process is started in response to reception of the print instruction and is ended by stopping the voltage application.

After the printing process (step S33), the controller 100 determines whether the first flag Fp is 1 (S34), the first flag Fp indicating that the access failure has occurred during the printing process. When it is determined at step S34 that the first flag Fp is 1 (Fp=1) (Yes), the controller 100 executes the second access process (S35).

After step S35, the controller 100 determines whether the access in the second access process performed in a non-execution period of the printing process has succeeded (S36). When it is determined at step S36 that the access has succeeded (Yes), namely, when the sheet counter Cp and the total dot counter CD in the main body memory 101 have been successfully written in the memory 55, the controller 100 sets the first flag Fp to 0 (S37).

When it is determined at step S36 that the access failure has occurred (No), namely, when the sheet counter Cp and the total dot counter CD in the main body memory 101 could not be successfully written in the memory 55, the controller 100 notifies an error (S39). After step S37 or step S39 or when a negative determination (No) is made at step S34, the controller 100 ends the present control.

Figure 6:
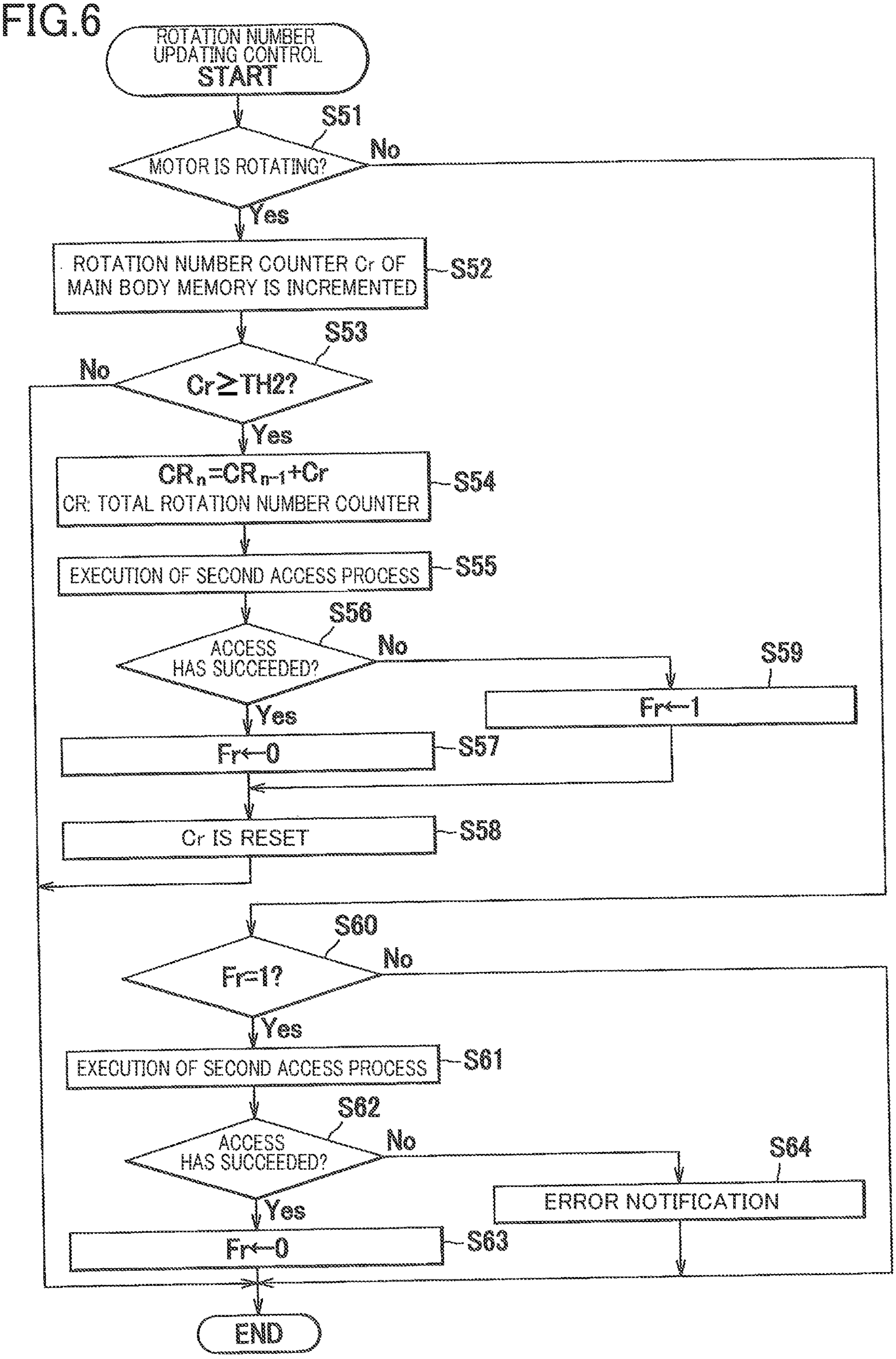
FIG. 6 is a flowchart indicating a rotation number updating control.

The controller 100 repeatedly executes a rotation number updating control shown in FIG. 6 all the time. In the rotation number updating control, the controller 100 determines whether the motor 210 is rotating (S51). When it is determined at step S51 that the motor 210 is rotating (Yes), the controller 100 increments the rotation number counter Cr of the main body memory 101 (S52). Specifically, at step S52, the controller 100 increments the rotation number counter Cr based on a signal from a sensor (not shown) configured to detect the number of rotations of the developing roller 53.

After step S52, the controller determines at S53 whether or not the rotation number counter Cr is equal to or greater than the second threshold TH2. When a negative determination (No) is made at S53, the controller 100 ends the present control. On the other hand, when it is determined at S53 that the rotation number counter Cr is equal to or greater than the second threshold TH2, step S54 is implemented at which the controller 100 calculates, as a current value $CR_n$ of the total rotation number counter CR, a value obtained by adding the rotation number counter Cr to a preceding value $CR_{n-1}$ of the total rotation number counter CR (S54). After step S54, the controller 100 executes the second access process (S55). That is, at step S55, the controller 100 executes the second access process during rotation of the motor 210.

After step S55, the controller 100 determines whether the access in the second access process performed during rotation of the motor 210 has succeeded (S56). When it is determined at step S56 that the access failure has occurred (No), the controller 100 sets a second flag Fr to 1 (S59), the second flag Fr indicating that the access failure has occurred.

When the access has succeeded at step S56 (Yes), the controller 100 sets the second flag Fr to 0 (S57). When the access at step S56 has succeeded, the total rotation number counter CR (the current value $CR_n$) of the main body memory 101 is written in the memory 55. After step S57 or step S59, the controller 100 resets the rotation number counter Cr (S58) and ends the present control.

When a negative determination (No) is made at step S51, the controller 100 determines whether the second flag Fr is 1 (S60). When it is determined at step S60 that the second flag Fr is 1 (Fr=1) (Yes), the controller 100 executes the second access process (S61). That is, at step S61, the controller 100 executes the second access process in a period in which the motor 210 is at rest.

After step S61, the controller 100 determines whether the access in the second access process performed in the period in which the motor 210 is at rest has succeeded (S62). When the access has succeeded at step S62 (Yes), namely, when the total rotation number counter CR of the main body memory 101 has been successfully written in the memory 55, the controller 100 sets the second flag Fr to 0 (S63).

When the access failure has occurred at step S62 (No), namely, when the total rotation number counter CR of the main body memory 101 could not be successfully written in the memory 55, the controller 100 notifies an error (S64). After step S63 or step S64 or when a negative determination (No) is made at step S60, the controller 100 ends the present control.

There will be next explained a concrete example of the operation of the controller 100.

As shown in FIGS. 4 and 5, in the case where the access failure has occurred in the second access (S28: No) during execution of the printing process (S21-S32), the first flag Fp is set to 1, but the printing process is not suspended or interrupted. When a next timing of the predetermined operation comes during execution of the printing process (S25: Yes), the controller 100 again executes the second access process (S27). When the access in the again executed second access process has succeeded (S28: Yes), the sheet counter Cp and the total dot counter CD of the main body memory 101 are successfully written in the memory 55, and the first flag Fp is accordingly set to 0 (S29).

In the case where the access failure has occurred in the last second access process performed during execution of the printing process, the first flag Fp is kept at 1. Accordingly, an affirmative determination (Yes) is made at step S34. Subsequently, at step S35, the second access process is executed. In this instance, because the motor 210 is at rest, namely, the motor 210 is not rotating (S32), the second access process can be executed without being adversely influenced by vibration arising from the rotation of the motor 210, for instance, thus resulting in a good chance of success of the access in the second access process. Further, because the voltage application to the developing roller 53, etc., is stopped (S33), an influence due to electric noise is reduced, resulting in a good chance of success of the access in the second access process.

As shown in FIG. 6, in the case where the access failure has occurred in the second access process during rotation of the motor, specifically, during execution of the printing process (S56: No), the second flag Fr is set to 1, but the printing process is not suspended or interrupted. When a next timing of the predetermined operation comes during execution of the printing process (S53: Yes), the controller 100 again executes the second access process (S55). In the case where the access in the again executed second access process has succeeded (S56: Yes), the total rotation number counter CR of the main body memory 101 is successfully written in the memory 55, and the second flag Fr is accordingly set to 0 (S57).

In the case where the access failure has occurred in the last second access process performed during rotation of the motor 210, the second flag Fr is kept at 1 and an affirmative determination (Yes) is accordingly made at step S60. Subsequently, the second access process is executed at step S61. In this instance, because the motor 210 is at rest, namely, the motor 210 is not rotating (S51: No), the second access process can be executed without being adversely influenced by vibration arising from the rotation of the motor 210, thus resulting in a good chance of success of the access in the second access process. Further, because the voltage application to the developing roller 53, etc., is stopped (S33), an influence due to electric noise is reduced, resulting in a good chance of success of the access in the second access process.

The present embodiment illustrated above offers the following advantageous effects.

Even if the access failure occurs in the printing process, the printing process is continued, decreasing the frequency of suspension or stoppage of printing.

The controller 100 executes the second access process in response to detection of the sheet P as the predetermined operation. In this configuration, each time image formation on one sheet P is completed, the second access process is executed, and the sheet counter Cp and the total dot counter CD of the memory 55 can be updated.

When the color printer 1 is turned on, the access to the memory 55 is executed in the first access process. In this configuration, even in the case where the process cartridge 50 is replaced with another one during turn-off of the color printer 1, the controller 100 can obtain information of the newly mounted process cartridge 50 when the color printer 1 is turned on.

When the front cover 11 is closed, the access to the memory 55 is executed in the first access process. In this configuration, in the case where the front cover 11 is opened and the process cartridge 50 is replaced with another one, the controller 100 can obtain information of the newly mounted process cartridge 50 when the front cover 11 is closed.

The controller 100 executes the first access process before the process cartridge 50 is operated. This configuration reduces or prevents an occurrence of the access abnormality arising from vibration and electric noise caused by the process cartridge 50 which is operated.

In the case where an abnormality occurs in the access in the first access process or the second access process, the abnormality can be removed or corrected by the predetermined number of times of retry.

The access abnormality is likely to occur during execution of the printing process due to vibration, electric noise or the like. The number of times of retry in the second access process is made larger than the number of times of retry in the first access process, so that the access abnormality during the printing process is easily removed.

It is to be understood that the present disclosure is not limited to the details of the illustrated embodiment but may be embodied otherwise as described below. In the following explanation, the same reference signs as used in the illustrated embodiment are used to identify substantially the same components and steps as those in the illustrated embodiment, and a detailed explanation thereof is dispensed with.

In the illustrated embodiment, each time image formation on one sheet P is completed (S25), the second access process is executed (S27), and the total dot counter CD is written in the memory 55. The present disclosure is not limited to this configuration. For instance, the controller 100 may be configured to execute the second access process in response to an increase of the obtained value of the usage amount of the toner by not less than a first threshold TH1 from a time point of a preceding predetermined operation, so as to write the total dot counter CD in the memory 55. In other words, the second access process may be triggered by, as the predetermined operation, the increase of the obtained value of the usage amount of the toner by not less than the first threshold TH1 from the time point of the preceding predetermined operation.

Figure 7:
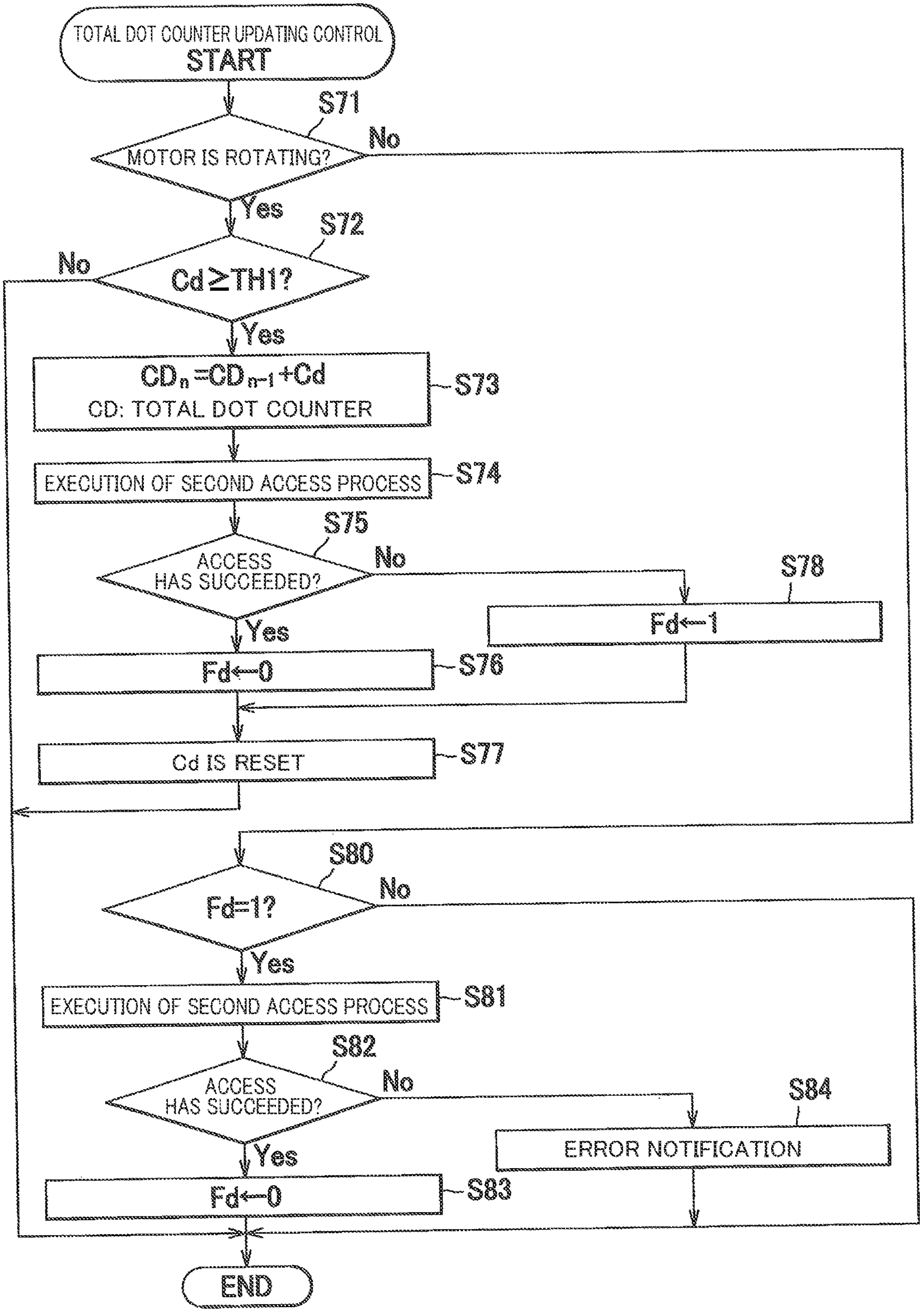
FIG. 7 is a flowchart indicating a total dot counter updating control.

Specifically, the controller 100 may be configured to execute the second access process relating to the total dot counter CD, according to a total dot counter updating control shown in FIG. 7. In the total dot counter updating control, the controller 100 first determines whether the motor 210 is rotating (S71).

When it is determined at step S71 that the motor 210 is rotating (Yes), the controller 100 determines whether or not a dot counter Cd, which is for determining timing of starting the second access process or timing of updating the total dot counter CD, is equal to or greater than the first threshold TH1 (S72). Here, the dot counter Cd is a counter configured to be reset (S77) every time the condition of step S72 is satisfied, and the dot counter Cd indicates that the obtained value of the usage amount of the toner has increased by not less than the first threshold TH1 from a time point of a preceding predetermined operation. Specifically, the dot counter Cd is a counter for indicating that the obtained value of the usage amount of the toner has currently increased by not less than the first threshold TH1 after the obtained value of the usage amount of the toner increased by not less than the first threshold TH1 last time.

In this modification, at step S26 of the print control shown in FIG. 4, the dot counter Cd is incremented in place of the total dot counter CD. Further, in the second access process at step S27, only the sheet counter Cp is written in the memory 55.

When it is determined at step S72 that the dot counter Cd is equal to or greater than the first threshold TH1 (Cd≥TH1) (Yes), the controller 100 calculates, as a current value $CD_n$ of the total dot counter CD, a value obtained by adding the dot counter Cd to a preceding value $CD_{n-1}$ of the total dot counter CD (S73). After step S73, the controller 100 executes the second access process (S74).

After step S74, the controller 100 determines whether the access in the second access process performed during rotation of the motor 210 has succeeded (S75). When it is determined at step S75 that the access failure has occurred (No), the controller 100 sets a third flag Fd to 1, the third flag Fd indicating that the access failure has occurred (S78).

When the access has succeeded at step S75 (Yes), the controller 100 sets the third flag Fd to 0 (S76). When the access at step S75 has succeeded, the total dot counter CD (the current value CM) of the main body memory 101 is written in the memory 55. After step S76 or step S78, the controller 100 resets the dot counter Cd (S77), and the present control is ended.

When a negative determination (No) is made at step S71, the controller 100 determines whether the third flag Fd is 1 (S80). When it is determined at step S80 that the third flag Fd is 1 (Fd=1) (Yes), the controller 100 executes the second access process (S81). That is, at step S81, the controller 100 executes the second access process in a period in which the motor 210 is at rest.

After step S81, the controller 100 determines whether the access in the second access process performed in the period in which the motor 210 is at rest has succeeded (S82). When the access has succeeded at step S82 (Yes), namely, when the total dot counter CD of the main body memory 101 has been successfully written in the memory 55, the controller 100 sets the third flag Fd to 0 (S83).

When the access failure has occurred at step S82 (No), namely, when the total dot counter CD of the main body memory 101 could not be successfully written in the memory 55, the controller 100 notifies an error (S84). After step S83 or step S84 or when a negative determination (No) is made at step S80, the controller 100 ends the present control.

In the illustrated embodiment, the process cartridge 50 is illustrated as one example of the cartridge. The present disclosure is not limited to this configuration. The cartridge may be a toner cartridge not equipped with the photoconductive drum and the developing roller.

In the illustrated the embodiment, the memory 55 is connected to the controller 100 by the electrode 12. The present disclosure is not limited to this configuration. The memory 55 and the controller 100 may wirelessly communicate. Also in this case, it is possible to reduce or obviate a failure of the access process due to electric noise arising from the voltage applied to the developing roller 53.

While the present disclosure is applied to the color printer 1 in the illustrated embodiment, the present disclosure may be applied to other printing devices such as a monochrome printer, a copying machine, and a multi-function peripheral (MFP).

In the illustrated embodiment, the sheet P such as thick paper, a post card, and thin paper is illustrated as one example of the sheet. The present disclosure is not limited to this configuration. The sheet may be an OHP sheet.

In the illustrated embodiment, the counter information is obtained from the memory 55 in the first access process. The present disclosure is not limited to this configuration. The counter information may be obtained from the memory in the second access process. That is, the process of writing information in the memory is at least executed in the second access process, and the process of obtaining information from the memory is optionally executed.

In the illustrated embodiment, the front cover 11 is illustrated as one example of the cover. The present disclosure is not limited to this configuration. The cover may be a top cover, for instance.

While each of the counters is of an increment type in the illustrated embodiment, each of the counters may be of a decrement type.

In the illustrated embodiment, the controller 100 executes the first access process in response to turn-on of the color printer 1 or in response to closing of the front cover 11. The present disclosure is not limited to this configuration. The controller 100 may be configured to execute the first access process before the printing process is executed, in response to reception of the print instruction.

The elements explained in the illustrated embodiment and the modification may be suitably combined.

What is claimed is:

1. A printer comprising:

a developing roller;

a cartridge storing developer, the cartridge including a first memory;

a controller communicable with the first memory; and a second memory, wherein the controller is configured to execute:

accessing the first memory in a state where the developing roller rotates, and accessing the first memory again in a case where failing to access the first memory in the state where the developing roller rotates, and wherein the controller reads counter information from the first memory when accessing the first memory, and the controller stores the counter information into the second memory.

2. The printer according to claim 1, further comprising an electrode being electrically connected to the first memory, wherein the controller is communicable with the first memory via the electrode.

3. The printer according to claim 1, further comprising a photosensitive drum, wherein the developing roller rotates to form a developer image on the photosensitive drum when the controller executes a printing process.

4. The printer according to claim 1, wherein the controller executes the accessing again in response to a timing of a predetermined operation of the printer.

5. The printer according to claim 1, wherein the controller writes counter information stored in the second memory into the first memory when accessing the first memory.

6. The printer according to claim 1, wherein the cartridge includes the developing roller.

7. The printer according to claim 1, further comprising a housing and a holder holding a photosensitive drum and removably mountable on the housing, wherein the cartridge is mountable on the holder.

8. The printer according to claim 1, further comprising a motor electrically connected to the controller, wherein the controller instructs the motor to rotate the developing roller.

9. A printer comprising:

a developing roller;

a cartridge storing developer, the cartridge including a first memory;

a controller communicable with the first memory; and a second memory, wherein the controller is configured to execute:

accessing the first memory in a state where the developing roller rotates, and accessing the first memory again in a case where failing to access the first memory in the state where the developing roller rotates, and wherein the controller writes counter information stored in the second memory into the first memory when accessing the first memory.

10. The printer according to claim 9, further comprising an electrode being electrically connected to the first memory, wherein the controller is communicable with the first memory via the electrode.

11. The printer according to claim 9, further comprising a photosensitive drum, wherein the developing roller rotates to form a developer image on the photosensitive drum when the controller executes a printing process.

12. The printer according to claim 9, wherein the controller executes the accessing again in response to a timing of a predetermined operation of the printer.

13. The printer according to claim 9, wherein the cartridge includes the developing roller.

14. The printer according to claim 9, further comprising a housing and a holder holding a photosensitive drum and removably mountable on the housing, wherein the cartridge is mountable on the holder.

15. The printer according to claim 9, further comprising a motor electrically connected to the controller, wherein the controller instructs the motor to rotate the developing roller.

* * * * *